United States Patent
Giurgiutiu et al.

(10) Patent No.: US 11,680,869 B2
(45) Date of Patent: Jun. 20, 2023

(54) VIBRATION TEST-CELL WITH AXIAL LOAD AND IN-SITU MICROSCOPY

(71) Applicant: University of South Carolina, Columbia, SC (US)

(72) Inventors: Victor Giurgiutiu, Columbia, SC (US); Yeasin Bhuiyan, Vergennes, VT (US); Matthew Droghini, Aiken, SC (US)

(73) Assignee: University of South Carolina, Columbia, SC (US)

( * ) Notice: Subject to any disclaimer, the term of this patent is extended or adjusted under 35 U.S.C. 154(b) by 326 days.

(21) Appl. No.: 17/010,988

(22) Filed: Sep. 3, 2020

(65) Prior Publication Data

US 2022/0065739 A1    Mar. 3, 2022

(51) Int. Cl.
*G01M 7/02* (2006.01)
*G01N 3/32* (2006.01)

(52) U.S. Cl.
CPC ............ *G01M 7/025* (2013.01); *G01M 7/022* (2013.01); *G01N 3/32* (2013.01); *G01N 2203/0067* (2013.01); *G01N 2203/0658* (2013.01)

(58) Field of Classification Search
CPC ............. G01N 3/32; G01N 2203/0067; G01N 2203/0658; G01M 5/0033; G01M 5/0066; G01M 7/022; G01M 7/025; G01M 7/04
See application file for complete search history.

(56) References Cited

U.S. PATENT DOCUMENTS

| | | | | |
|---|---|---|---|---|
| 4,089,224 A | * | 5/1978 | Scott | G01N 3/06 73/587 |
| 5,063,785 A | * | 11/1991 | Labuz | G01N 3/10 73/821 |
| 9,297,731 B2 | * | 3/2016 | Bellin | G01N 29/223 |
| 9,423,330 B2 | * | 8/2016 | Mary | G01M 7/027 |
| 2006/0070452 A1 | * | 4/2006 | Bohlmann | G01N 3/08 73/800 |
| 2016/0061688 A1 | * | 3/2016 | Van Wittenberghe | G01M 5/0041 73/577 |
| 2019/0360971 A1 | * | 11/2019 | Zhang | G01N 29/14 |
| 2020/0232950 A1 | * | 7/2020 | Xu | G01N 3/08 |
| 2021/0396155 A1 | * | 12/2021 | Shiomi | G01N 3/34 |
| 2022/0065764 A1 | * | 3/2022 | Kawasaki | G01N 3/066 |

FOREIGN PATENT DOCUMENTS

| | | | | |
|---|---|---|---|---|
| CN | 103728183 A | * | 4/2014 | |
| CN | 110161048 A | * | 8/2019 | |
| CN | 213022685 U | * | 4/2021 | G01N 3/36 |
| CN | 112082886 B | * | 6/2021 | G01N 3/32 |

* cited by examiner

*Primary Examiner* — Natalie Huls
(74) *Attorney, Agent, or Firm* — Burr & Forman LLP; Douglas L. Lineberry

(57) ABSTRACT

A new vibration test-cell that allows a static load to be applied simultaneously with lateral vibration coupled with in-situ microscopy that allows for the ability to open a fatigue crack up to a desired gap, as well as generate acoustic emission (AE) from vibration excitation, micro-fracture events are captured by the AE measurement while the physical observation of the crack faying surfaces is performed in-situ with an optical microscope embedded in the test cell.

18 Claims, 9 Drawing Sheets

VIBRATION TEST-CELL WITH AXIAL LOAD AND IN-SITU MICROSCOPY

This invention was made with government support under N00014-17-1-2829 awarded by Office of Naval Research. The government may have certain rights in this invention.

BACKGROUND OF THE INVENTION

1) Field of the Invention

The present invention relates to a vibration test-cell that allows a static load to be applied simultaneously with lateral vibration coupled with in-situ microscopy that allows for the ability to open a fatigue crack up to a desired gap, as well as generate acoustic emission (AE) from vibration excitation, micro-fracture events are captured by the AE measurement while the physical observation of the crack faying surfaces is performed in-situ with an optical microscope embedded in the test cell.

2) Description of Related Art

Capturing micro-fracture events from fatigue crack rubbing/clapping on a traditional tensile testing machine has proven to be difficult. The mounting of a heavy mechanical shaker to the tensile testing machine even makes it more difficult. Accordingly, it is an object of the present disclosure to provide a newly designed and manufactured vibration test-cell that can overcome these difficulties by allowing a static load to be applied simultaneously with lateral vibration from a shaker and in-situ microscopy. This allows for the ability to open a fatigue crack up to a desired gap as well as generate acoustic emission (AE) from vibration excitation. Micro-fracture events are captured by the AE measurement while the physical observation of the crack faying surfaces is performed in-situ with an optical microscope embedded in the test cell.

SUMMARY OF THE INVENTION

The above objectives are accomplished according to the present invention by providing in a first embodiment, a vibration test cell for detecting micro fractures. The test cell may include a mechanical load frame for retaining a specimen, a mechanical shaker, an optical microscope with a camera, and an acoustic emission measuring apparatus for measuring acoustic emissions from the specimen. Further, the mechanical load frame may retain the specimen and may apply static load to the specimen. Still yet, the mechanical shaker may apply lateral vibration to the specimen mounted on the mechanical load frame. Again, the specimen may be placed under axial load while lateral vibration may also be applied to the specimen. Still again, a micro fracture event may produce acoustic waves that may propagate in the specimen and may be captured by the acoustic emission measuring apparatus. Moreover, load may be applied to open a micro fracture to a first specific displacement. Still again, acoustic waves may be generated at the first specific displacement to study crack behavior at the first specific dis-placement. Further again, the micro fracture may be opened to a second specific displacement that differs from the first specific displacement. Still yet, acoustic sensors may be affixed to the specimen. Again yet, a frequency response of the specimen may be measured at various axial loads. Further still, the mechanical load frame, mechanical shaker, optical microscope, and/or acoustic emission measuring apparatus may be used independently from one another to test the specimen. Again further, the mechanical load frame, mechanical shaker, optical microscope, and/or acoustic emission measuring apparatus may be used simultaneously to test the specimen.

In a further embodiment, a method for determining if a specimen contains a micro-fracture event is provided. The method may include securing a specimen to be tested to a mechanical load frame, applying an axial load to the specimen, applying a vibration excitation to the specimen, capturing at least one visual image of the specimen, and capturing at least one acoustic emission from the specimen. Further, an acoustic sensor may be bonded to the specimen. Still yet, a micro fracture event may produce acoustic waves that propagate in the specimen and are captured. Again, axial load may be applied to open a micro fracture to a first specific displacement. Still again, acoustic waves may be generated at the first specific displacement to study crack behavior at the first specific displacement. Further still, the micro fracture may be opened to a second specific displacement that differs from the first specific displacement. Further yet, a frequency response of the specimen may be measured at various axial loads. Again still, axial load and vibration excitement may be applied independently from one another to test the specimen. Still further, axial load and vibration excitement may be applied simultaneously to test the specimen.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

Figure 1:
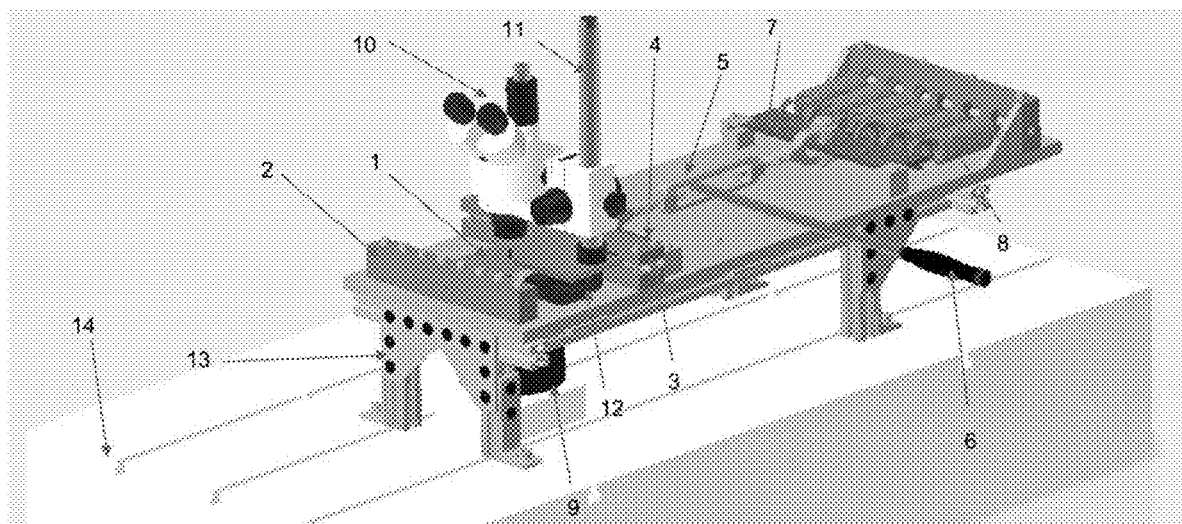
FIG. 1 shows a CAD model of a test cell, isometric view, per the current disclosure.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein inter-changeably and are meant to include the first and second indicated numbers and all the fractional and integral numerals therebetween.

Understanding the behavior of a fatigue crack can prevent aircraft structural failure and save the lives of millions of passengers travelling everyday around the world. The test-cell disclosed herein enables understanding micro-fracture events during fatigue crack vibration. The test-cell was designed and manufactured in the Laboratory of Active Materials and Smart Structures (LAMSS), USC, Columbia. The test-cell is inexpensive and has and a simple design. It has four subsystems: mechanical load frame, mechanical shaker, optical microscope, and acoustic emission measurement. Each of the sub-systems can function independently or simultaneously with each other which make it very versatile and useful.

Figure 2:
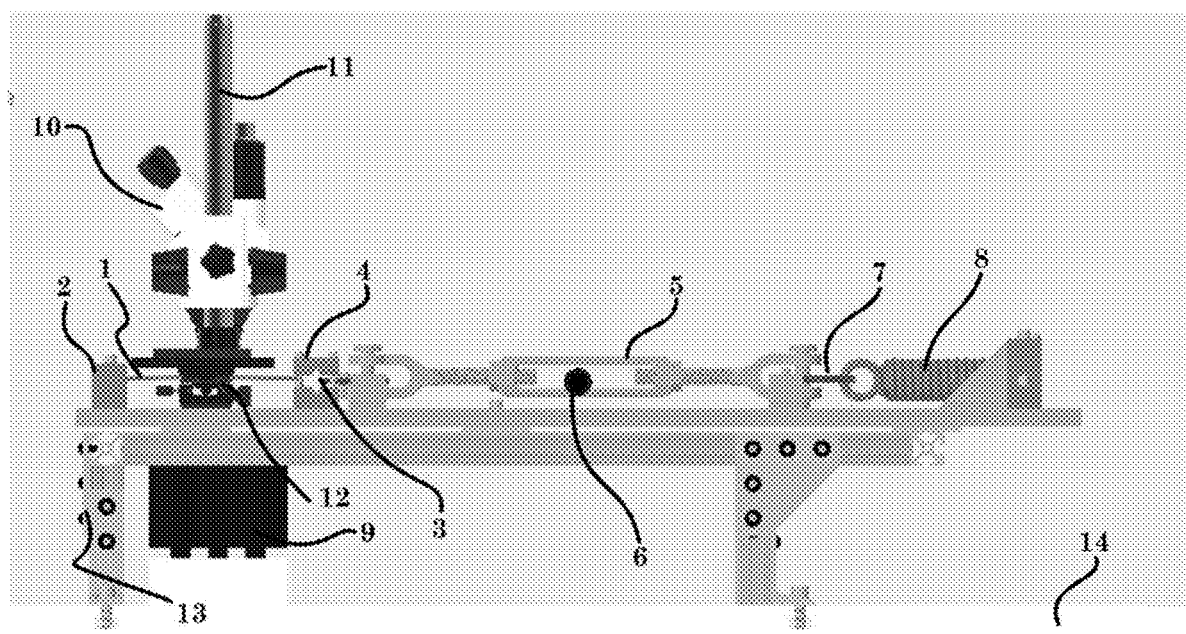
FIG. 2 shows a CAD model of a test cell, side view, per the current disclosure.

A test-cell was designed based on a design load of 20 kN and a 3D CAD model was generated as illustrated in FIGS. 1 and 2. Every component in this test cell was designed by using the concept of solid mechanics to sustain the design load with a safety margin of 1.2.

FIG. 1 shows a model device of the current disclosure wherein element: 1 represents a specimen sample; 2 represents a specimen retainer; 3 is a specimen slider with rollers; 4 is a turning plate; 5 is a turnbuckle; 6 is a loading bar; 7 is a spring plate; 8 is extension springs; 9 is a mechanical shaker; 10 is an optical microscope; 11 is a mountain pole; 12 is an x-y plane slider; 13 is a 80/20 framing system; and 14 is a t-slotted table.

The entire vibration test-cell system consists of four main sub-systems: (1) the mechanical load frame, (2) mechanical shaker, (3) optical microscope, and (4) acoustic emission measurement. Each sub-system has its own functionality and can work independently and/or coupled with each other. Thus, each of the sub-systems can function independently or simultaneously with each other which makes it very versatile and useful. The mechanical load frame retains the specimen firmly and applies various static load. The mechanical shaker applies lateral vibration to the specimen mounted in the load frame. The optical microscope-camera observes the physical changes of the micro fracture/crack in the specimen, measures the crack opening at various load levels, and captures the image of the crack opening using a DSLR camera mounted in the microscope. The acoustic emission measurement device measures the acoustic emissions during the crack rubbing/clapping due to micro-fracture event occurring in the crack faying surface.

As illustrated in FIG. 1, a specimen 1 is clamped by specimen retainer 2 on one end of the mechanical load frame. The other end of the specimen is rested on specimen slider with rollers 3 which allows moving of the specimen in the axial direction only. Specimen 1 is clamped between loading plates 4, which may be two, three, four or more loading plates and the current disclosure should not be considered limited to only two loading plates as shown in FIGS. 1 and 2, which is attached to turnbuckle 5. Loading bar 6 is used to turn turnbuckle 5, which eventually applies the axial load to specimen 1. The other end of turnbuckle 5 is connected to spring plate 7. Spring plate 7 is connected to a plurality of extension springs, while seven (7) springs are shown in FIG. 1, the current disclosure is not so limited and more or less springs are considered within the scope of the disclosure such as 3, 4, 5, 8, 9, 10 springs, etc. Each spring may have a spring constant ranging from 50 to 140 N/mm, 70 to 130 N/mm, 90 to 120 N/mm, 100 to 115 N/mm, which in one preferred embodiment may be 110 N/mm for each spring). The springs are connected to a retainer wall with counter forts. Underneath specimen 1, shaker 9 can be placed to produce vibration excitement to specimen 1. A microscope with a DSLR camera 10 can be placed on top of specimen 1 hanging from mounting pole 11. An x-y slider 12 allows for fine movement of microscope/camera 10. The microscope assembly allows microscope 10 to move in the X, Y and Z directions for fine adjustment of focusing on a desired area of specimen 1. All mechanical components may be placed onto frame 13, which may be constructed from 80/20 aluminum framing, and secured to t-slotted table 14.

Figure 3:
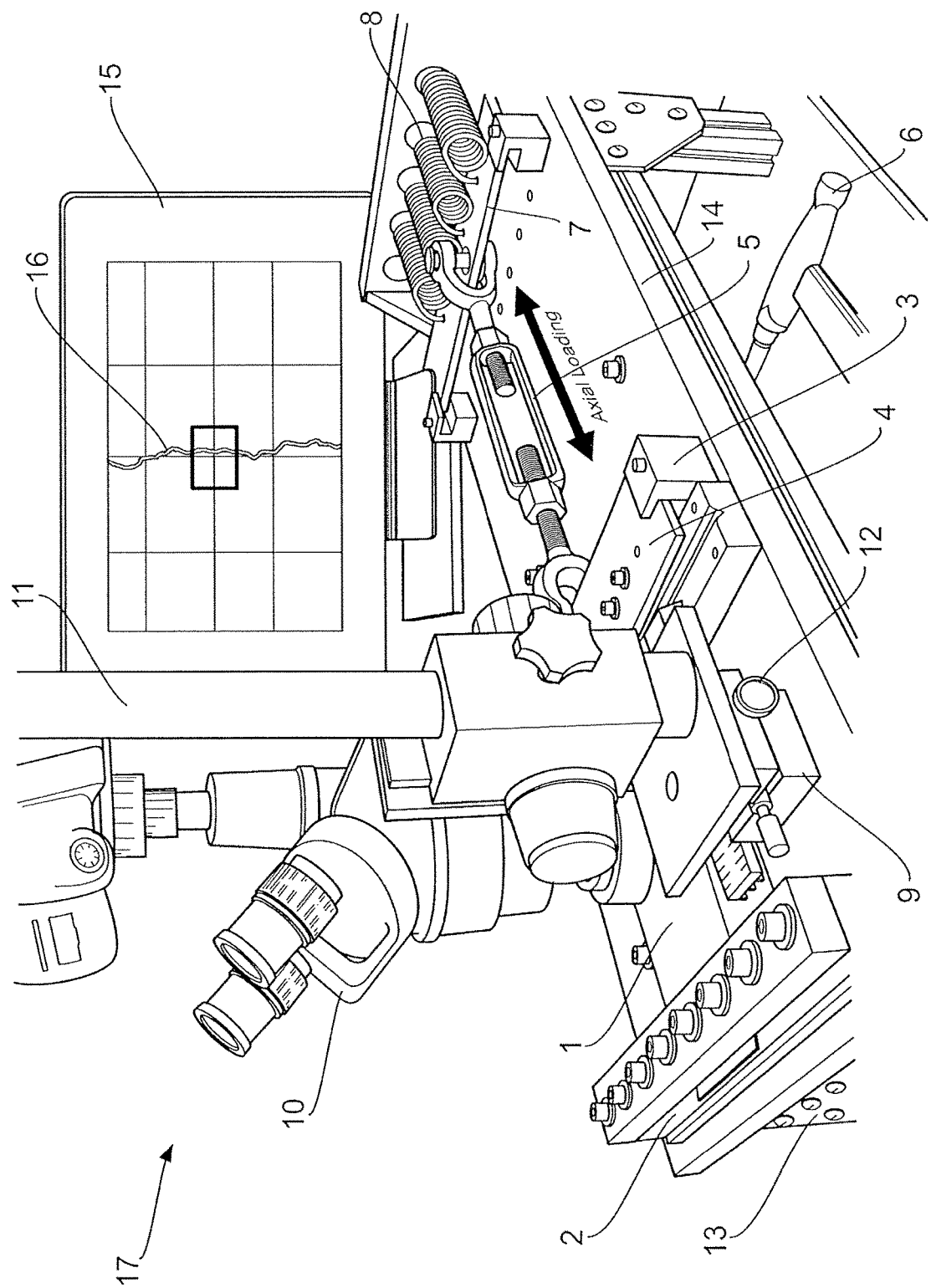
FIG. 3 shows a picture of a test cell manufactured per the current disclosure with microscope-camera attachments.

Vibration test cell 17, see FIG. 3, was manufactured by using the machine shop facilities of the Mechanical Engineering Department, University of South Carolina. The manufactured test-cell with microscope-camera attachments is shown in FIG. 3. Monitor 15 shows a magnified view of micro-fracture/crack 16 in specimen 1. Specimen 1 was made of aluminum A1-2024 T3. A 1-mm hole was drilled at the center of specimen 1 to initiate crack 16 under cyclic fatigue loading (2.3 kN to 23 kN) via a hydraulic MTS machine. While fatigue crack 16 grew up to 15-mm, then the fatigue-cracked specimen 1 was tested in vibration test-cell 17.

Figure 4:
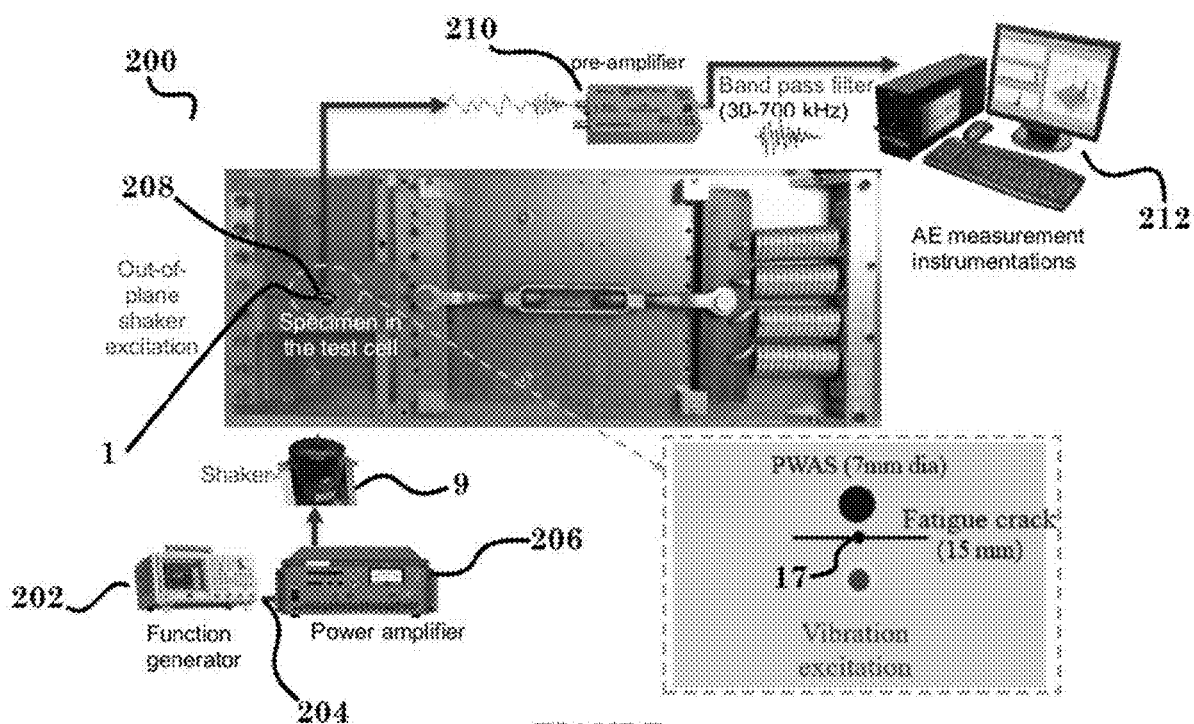
FIG. 4 shows a schematic AE test under shaker vibration with axial tension.

The acoustic emission (AE) measurement setup 200 is illustrated in FIG. 4. While specimen 1 was under axial load, mechanical shaker 9 was placed underneath and coupled to specimen 1 to apply the lateral vibration. Function generator 202 sends a signal 204 to amplifier 206 and then on to shaker 9 to produce a vibration excitement in specimen 1. Piezoelectric Wafer Active Sensors (PWAS) 208 bonded to specimen 1 receive the AE events produced by the movement, such as rubbing/clapping, of fatigue crack 17 faying surfaces due to the applied vibration to specimen 1. The microfracture events produce movement, such as rubbing/clapping, of the fatigue crack 17 faying surfaces. This in turn produces acoustic waves that propagate in specimen 1 and are captured by PWAS 208. PWAS 208 converts the strain waves into electrical signals which are amplified using at least one pre-amplifier 210 are then recorded by the AE measurement instrumentation 212.

Figure 5:
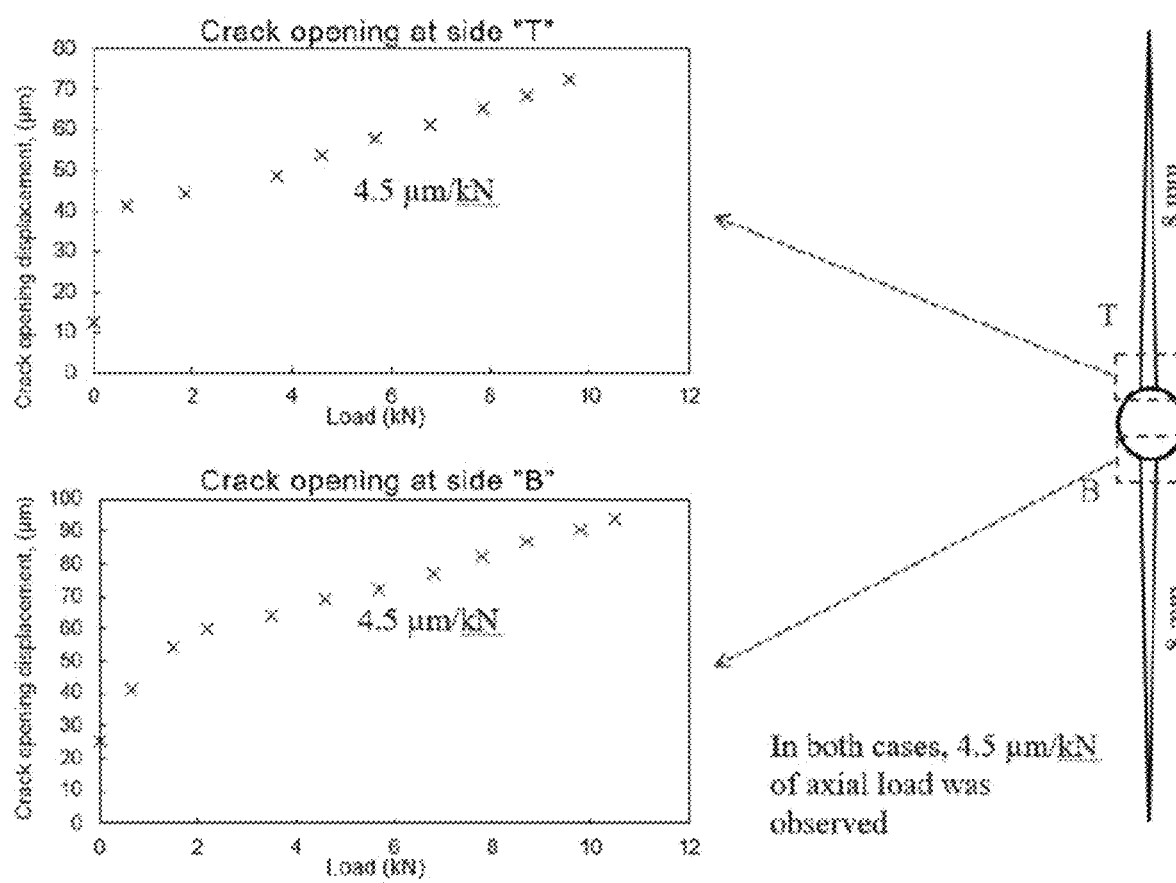
FIG. 5 shows graphs of crack opening measurement at various axial loads.
Figure 6:
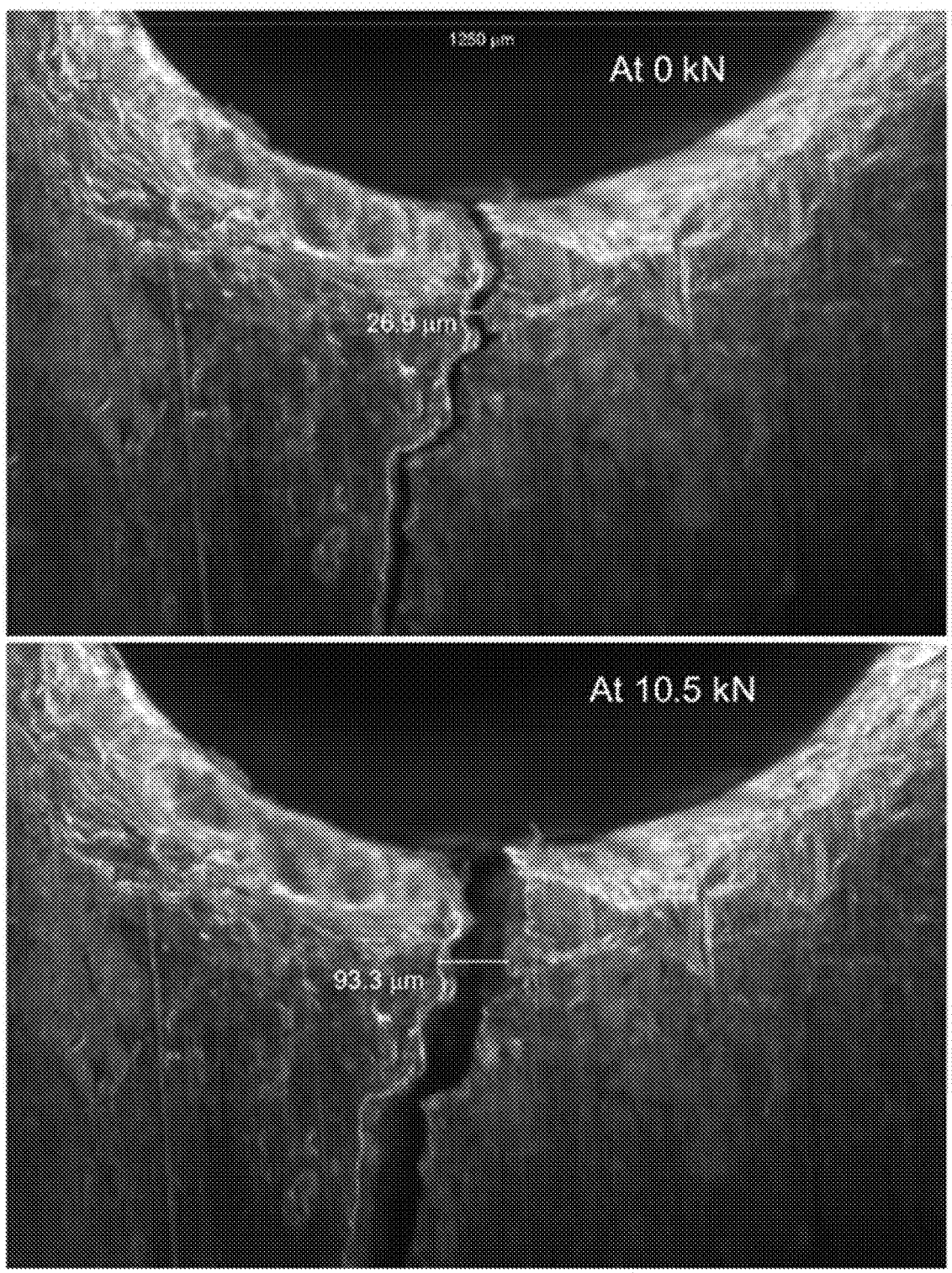
FIG. 6 shows microscopic images of crack opening at 0 kN and 10.5 kN load.

With this test-cell, it is possible to apply an axial load to the specimen to open the fatigue crack to a selected displacement, such as a specified crack gap distance between the faying surfaces, in order to further study the fatigue crack. The current disclosure test-cell may also further open a crack to greater displacements after a previous selected displacement has been studied. The specific displacement may vary based on the specimen and testing required. Sample crack opening displacement results are illustrated in FIG. 5. The microscopic-camera images at two load levels (0 and 10.5 kN) can be seen in FIG. 6. The image processing provides the crack opening displacements as marked in the two images in FIG. 6.

Figure 7:
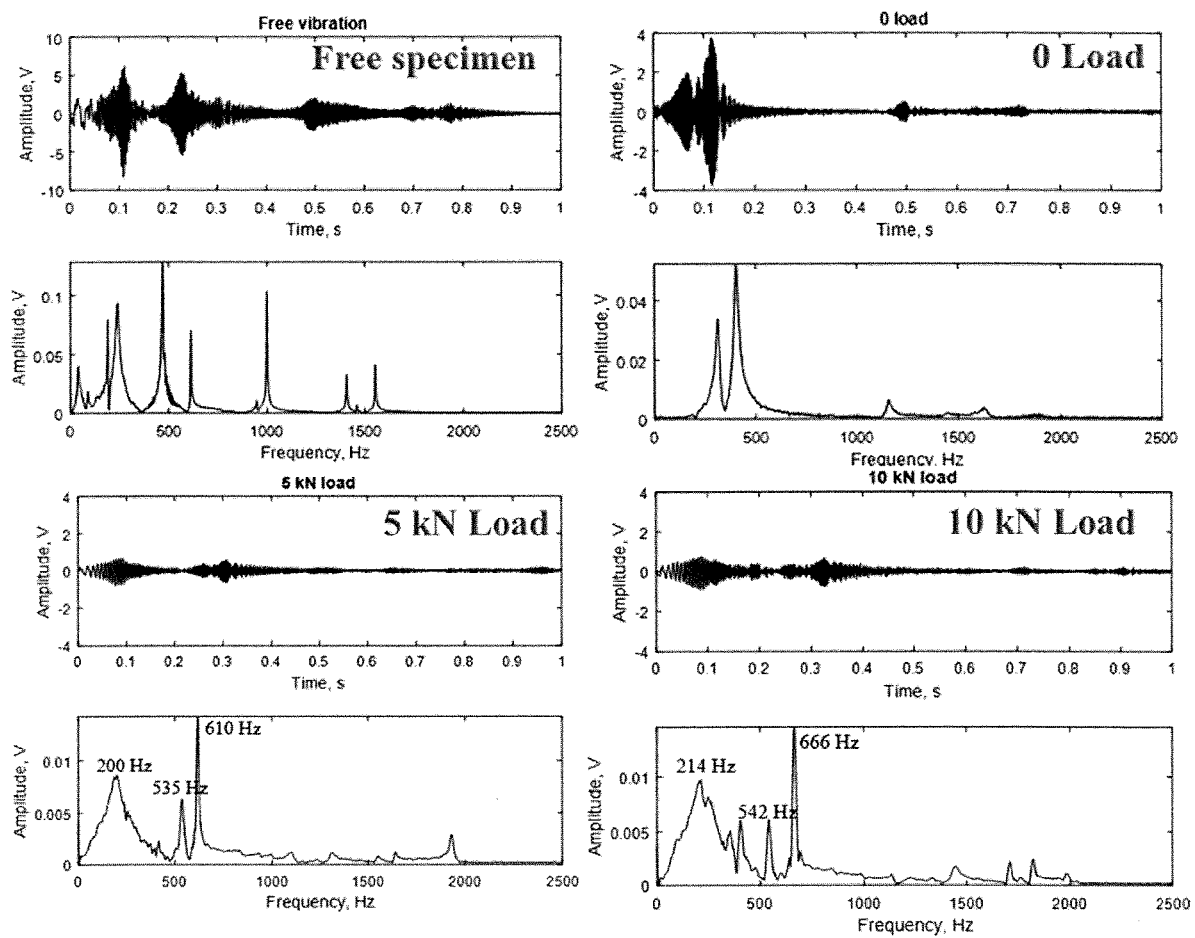
FIG. 7 shows frequency responses of a free specimen, and the specimen at 0, 5, and 10 kN axial load.

With this test-cell, it is also possible to measure the frequency response of the specimen at various axial loads. The frequency response results for a free specimen, and the specimen at 0, 5, and 10 kN are illustrated in FIG. 7.

Figure 8:
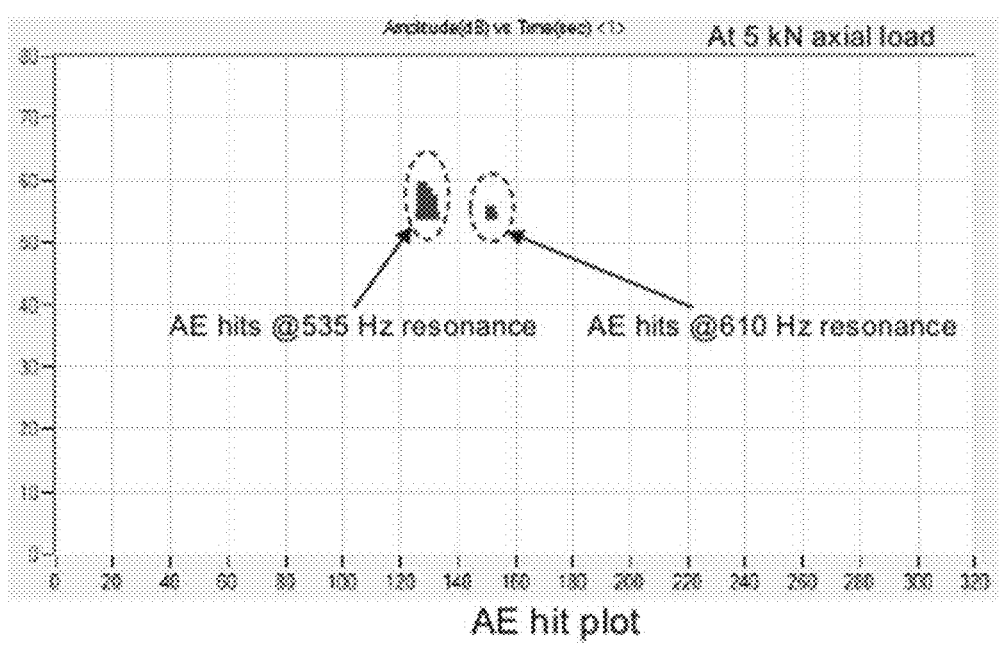
FIG. 8 shows acoustic emission (AE) hits measurement @5 kN axial load. The AE hits occurred near two resonances (535 Hz and 610 Hz).

The test-cell also allows acoustic emission measurement at various axial load levels. The AE measurement results at 5 kN axial load is shown in FIG. 8. It was found that the AE signals triggering is related to the frequency response of the specimen. We also found that not all resonances are sensitive to produce AE signals. Certain resonances (e.g. 535 Hz and 610 Hz) can trigger AE signals since these resonances can excite the crack faying surfaces.

Figure 9:
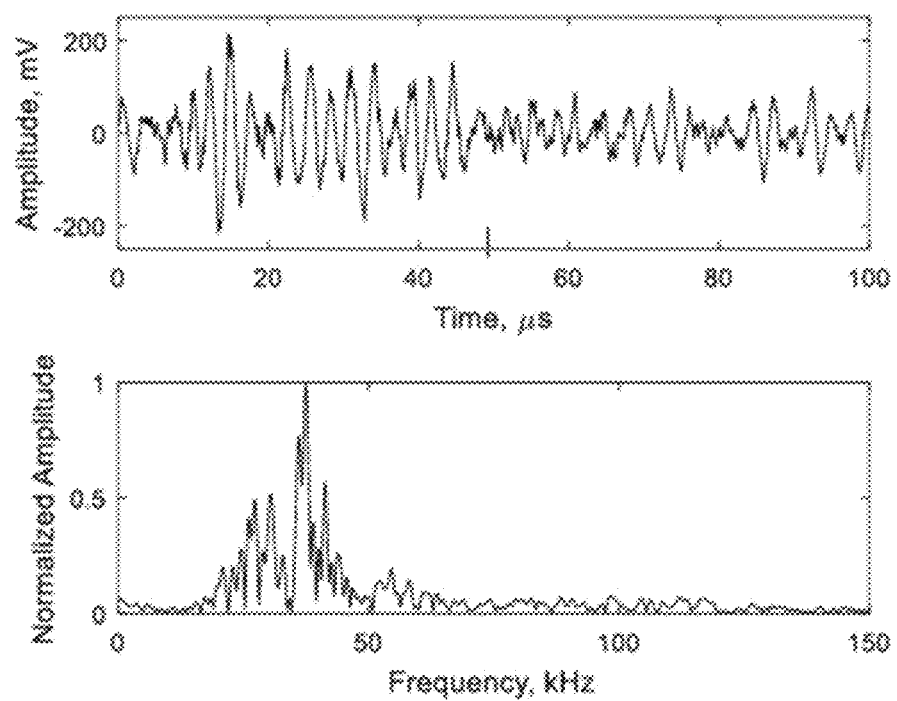
FIG. 9 shows a typical AE signal and its frequency spectrum recording during crack vibration.

A typical AE signal and its frequency spectrum is shown in FIG. 9. It shows that the AE signal contains higher frequency content such as 40 kHz, 48 kHz even though the excitation was just only 535 Hz. Hence, these AE signals are not coming from the direct shaker vibration but coming from the crack rubbing/clapping related AE events.

This test cell easily incorporates all the systems needed for proper experimentation of a fatigue-cracked specimen. The concerns of machine vibration, mounting constraints, alignments, and positioning difficulties are eliminated by this setup.

The largest novelty of this disclosure is the ability to apply lateral vibration under various axial load while observing the crack opening with an in-situ microscope and acoustic emission measurement from the micro-fracture events.

Attempts in the past have been made to monitor fatigue crack growth and crack opening displacement under load in a controlled setting (de Pannemaecker, Fouvry, Buffiere, & Brochu, 2018; Noraphaiphipaksa, Manonukul, Kanchanomai, & Mutoh, 2016; Robert, Dariusz, & Kotyk, 2016; Sullivan & Crooker, 1977; Sutton, McNeill, Helm, & Boone, 2002; Suzuki & Iwanaga, 2009; Vormwald, Hos, Freire, Gonzales, & Diaz, 2018). This includes digital image correlation, use of crack gauge, and finite element predictions, etc. The AE measurement from the crack growth has been reported by many authors (Bhuiyan & Giurgiutiu, 2017; Lee et al., 2006; Ning, Chu, & Ren, 2014; Roberts & Talebzadeh, 2003). However, the AE measurement from crack rubbing/clapping under the vibration excitation has not been reported so far.

We also performed microscopy in metrology labs as well as mounting a high-resolution camera with extension tubes, and later a microscope, to a platform on an MTS machine. These techniques have led to less than desirable results. Viewing the specimen under a microscope in the metrology lab was inconvenient and did not allow for observation of a loaded specimen. Using the high-resolution camera was convenient and the specimen could be viewed while loaded but at a limited magnification. The addition of extension tubes made for higher magnification but fine tuning to the location of crack growth was difficult and minute vibrations caused by the MTS machine made the images captures unusable due to the low weight of the camera and decreased the field of view. A microscope was then used but experienced similar issues to the camera but because the microscope was much larger, the viewing angle was not perpendicular to the specimen due to limited space between the mounting location and specimen.

The benefits of the current disclosure are several fold:
This test-cell can easily incorporate four sub-systems (mechanical load frame, mechanical shaker, optical microscope with digital single-lens reflex camera (DSLR) camera, and acoustic emission measurement) independently and/or coupled with each other;
The test-cell load frame is simple in design and easy to manufacture;
The test-cell is significantly cheaper than its commercial counterparts such as tensile testing machine;
The operation of the test-cell is so easy to operate using human power and does not involve complicated hydraulics and electric power requirement;
This test-cell load frame is fully-mechanical and capable of applying up to 20 kN axial load;

This test-cell can measure the crack opening displacement at various axial load levels;

This test-cell contains a x-y-z motion slider for microscope camera for fine focus adjustment;

This test-cell can be used to generate crack rubbing and clapping of the crack-faying surfaces at various axial loads;

This test-cell allows the acoustic emission measurement for crack rubbing/clapping due to specimen vibration;

This test-cell can be used to measure the frequency response at various axial static loads;

This test-cell allows the study of fatigue crack behavior under various axial load; and This test-cell can be used to achieve a specific crack opening displacement and study the fatigue crack behavior at this displacement and/or the crack may be opened to another specific crack opening displacement, which differs from the first specific crack opening displacement.

All patents, patent applications, published applications, and publications, databases, websites and other published materials referred to throughout the entire disclosure herein, unless noted otherwise, are incorporated herein by reference in their entirety.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A vibration test cell for detecting micro fractures comprising:
    a mechanical load frame for retaining a specimen;
    a mechanical shaker;
    an optical microscope with a camera;
    an acoustic emission measuring apparatus for measuring acoustic emissions from the specimen; and
    wherein a frequency response of the specimen is measured at various axial loads.

2. The vibration test cell of claim 1, wherein the mechanical load frame retains the specimen and applies static load to the specimen.

3. The vibration test cell of claim 1, wherein the mechanical shaker applies lateral vibration to the specimen mounted on the mechanical load frame.

4. The vibration test cell of claim 1, wherein the specimen is placed under axial load with lateral vibration also applied to the specimen.

5. The vibration test cell of claim 1, wherein a micro fracture event produces acoustic waves that propagate in the specimen and are captured by the acoustic emission measuring apparatus.

6. The vibration test cell of claim 1, wherein axial load is applied to open a micro fracture to a first specific displacement.

7. The vibration test cell of claim 6, wherein acoustic waves are generated at the first specific displacement to study crack behavior at the first specific displacement.

8. The vibration test cell of claim 7, wherein the micro fracture is opened to a second specific displacement that differs from the first specific displacement.

9. The vibration test cell of claim 1, wherein acoustic sensors are affixed to the specimen.

10. The vibration test cell of claim 1, wherein the mechanical load frame, mechanical shaker, optical microscope, and/or acoustic emission measuring apparatus are used independently from one another to test the specimen.

11. The vibration test cell of claim 1, wherein the mechanical load frame, mechanical shaker, optical microscope, and/or acoustic emission measuring apparatus are used simultaneously to test the specimen.

12. A method for determining if a specimen contains a micro-fracture event comprising:
    securing a specimen to be tested to a mechanical load frame;
    applying an axial load to the specimen;
    applying a vibration excitement to the specimen;
    capturing at least one visual image of the specimen; and
    capturing at least one acoustic emission from the specimen; and
    wherein axial load is applied to open a micro fracture to a first specific displacement.

13. The method of claim 12, wherein a micro fracture event produces acoustic waves that propagate in the specimen and are captured.

14. The method of claim 12, wherein acoustic waves are generated at the first specific displacement to study crack behavior at the first specific displacement.

15. The method of claim 14, wherein the micro fracture is opened to a second specific displacement that differs from the first specific displacement.

16. The method of claim 12, wherein a frequency response of the specimen is measured at various axial loads.

17. The method of claim 12, wherein axial load and vibration excitement are applied independently from one another to test the specimen.

18. The method of claim 12, wherein axial load and vibration excitement are applied simultaneously to test the specimen.

* * * * *